(12) United States Patent
Oakley, Jr.

(10) Patent No.: US 12,009,779 B2
(45) Date of Patent: Jun. 11, 2024

(54) PORTABLE SOLAR ARRAY WITH LOCKING MECHANISM FOR MAXIMIZING ELECTRICAL OUTPUT

(71) Applicant: XPLOR LLC, Woodstock, NY (US)

(72) Inventor: Gary William Oakley, Jr., Woodstock, NY (US)

(73) Assignee: XPLOR LLC, Woodstock, NY (US)

( * ) Notice: Subject to any disclaimer, the term of this patent is extended or adjusted under 35 U.S.C. 154(b) by 0 days.

(21) Appl. No.: 17/366,978

(22) Filed: Jul. 2, 2021

(65) Prior Publication Data
US 2022/0006422 A1   Jan. 6, 2022

Related U.S. Application Data

(60) Provisional application No. 62/705,552, filed on Jul. 3, 2020.

(51) Int. Cl.
   *H02S 30/20*   (2014.01)
   *H02S 30/10*   (2014.01)
   *H02S 40/34*   (2014.01)

(52) U.S. Cl.
   CPC .............. *H02S 30/20* (2014.12); *H02S 30/10* (2014.12); *H02S 40/34* (2014.12)

(58) Field of Classification Search
   CPC .................................. H02S 10/40; H02S 30/20
   See application file for complete search history.

(56) References Cited

U.S. PATENT DOCUMENTS

| 6,031,178 | A   | * | 2/2000  | Kester .................... B64G 1/44 |
|           |     |   |         |                              16/75 |
| 6,294,724 | B1  |   | 9/2001  | Sasaoka et al. |
| 7,162,774 | B1  | * | 1/2007  | Von Resch ............ E05D 7/0054 |
|           |     |   |         |                              16/236 |
| 2009/0320905 | A1 |   | 12/2009 | Botkin et al. |
| 2015/0222226 | A1 |   | 8/2015  | Giles |
| 2017/0040934 | A1 |   | 2/2017  | Xie |
| 2018/0083480 | A1 | * | 3/2018  | Burton .................... H02S 40/38 |
| 2020/0098943 | A1 |   | 3/2020  | Terashita et al. |
| 2021/0203274 | A1 | * | 7/2021  | Jun ........................ H02S 30/20 |

FOREIGN PATENT DOCUMENTS

CN    205610557 U    9/2016

OTHER PUBLICATIONS

PCT International Search Report & Written Opinion dated Oct. 27, 2021 corresponding to PCT International Application No. PCT/EP2021/040328.

* cited by examiner

*Primary Examiner* — Daniel P Malley, Jr.
(74) *Attorney, Agent, or Firm* — Schmeiser, Olsen & Watts, LLP

(57) ABSTRACT

A modular solar device including a solar panel, a housing containing circuitry coupled to the solar panel, a first connector of a first type disposed on a first side of the housing, and a second connector of a second type disposed on a second side of the housing, wherein the first connector is configured to mate with a connector of the second type, and the second connector is configured to mate with a connector of the first type to allow additional modular solar devices to be connected to the modular solar device, is provided. A scalable solar panel array is also provided.

9 Claims, 9 Drawing Sheets

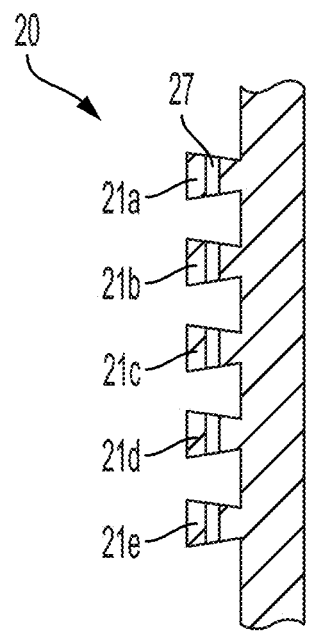
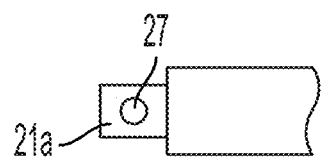
FIG. 6  FIG. 7
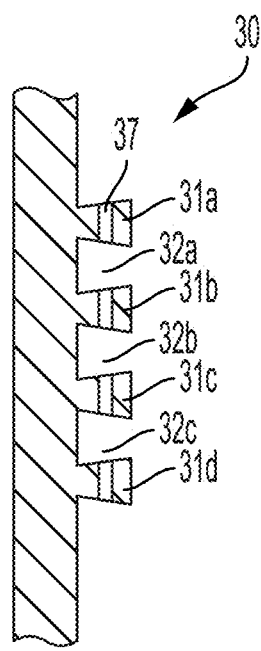
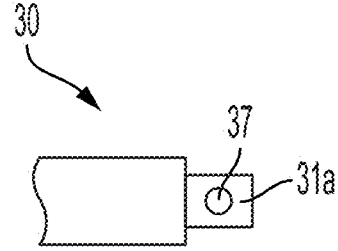
FIG. 8  FIG. 9

PORTABLE SOLAR ARRAY WITH LOCKING MECHANISM FOR MAXIMIZING ELECTRICAL OUTPUT

CROSS-REFERENCE TO RELATED APPLICATIONS

This application claims the benefit of and priority to U.S. Provisional Application No. 62/705,552, filed Jul. 3, 2020, and entitled "Portable Solar Charger With Locking Hinge Mechanism, Case and Mounting System".

FIELD OF TECHNOLOGY

The following relates to embodiments of portable solar array, and more specifically to embodiments of a portable solar array with a locking hinge for adjusting an angle between solar panels.

BACKGROUND

Battery powered electronic devices can be recharged when the electrical storage of the battery is less than fully charged. Portable solar panels can be used as a power source for recharging batteries of battery powered devices. Conventional portable solar panels used for recharging struggle to maximize the capturing of incoming solar radiation, and can lack a required or desirable output.

SUMMARY

An aspect relates to a modular solar device comprising: a solar panel, a housing containing circuitry coupled to the solar panel, a first connector of a first type disposed on the housing, and a second connector of a second type disposed on the housing, wherein the first connector is configured to mate with a connector of the second type, and the second connector is configured to mate with a connector of the first type to allow additional modular solar devices to be connected to the modular solar device.

In an exemplary embodiment, the first connector of the first type is disposed on a first side of the housing, and the second connector of the second type is disposed on a second side of the housing.

In an exemplary embodiment, the first connector and the second connector each include a combination of fingers and slots, wherein the fingers each have a central opening that is aligned with neighboring fingers. A locking pin is configured to be inserted through the central openings of the fingers to lock the modular solar device to an adjacent modular solar device.

In an exemplary embodiment, the first type of connector includes one more finger and one more slot than the second type of connector.

In an exemplary embodiment, the modular solar device includes at least one cable connection interface coupled to the circuitry contained within the housing, the at least one cable connection interface comprising a receptacle accessible proximate an exterior surface of the housing. The at least one cable connection interface allows a transfer of an electrical energy generated by the modular solar device to an external power consuming device.

In an exemplary embodiment, the modular solar device includes an attachment device disposed on an exterior surface of the housing for attaching the modular solar device to an object.

In an exemplary embodiment, the modular solar device includes a cable attached to the housing and configured to be plugged into a neighboring modular solar device to electrically couple the modular solar device with the neighboring modular solar device.

Another aspect relates to a scalable solar panel array comprising a plurality of modular solar devices mechanically and electrically connected together, each modular solar device comprising a first connector of a first type and a second connector of a second type, and a plurality of pivot points formed by connections between the first connector of the first type and the second connector of the second type of neighboring modular solar devices, wherein the plurality of modular solar devices are each movable about the plurality of pivot points and lockable into a fixed position with respect to an adjacent modular solar device.

In an exemplary embodiment, when one modular solar device of the scalable solar panel array is moved with respect to the adjacent modular solar device about a pivot point, the one modular solar device is locked into the fixed position by a locking pin being inserted through the pivot point.

In an exemplary embodiment, the plurality of modular solar devices are movable and locked into fixed positions to form a parabolic shape of the scalable solar panel array.

Another aspect relates to a method of scaling a solar array, the method comprising: providing a modular solar panel device including a solar panel, a housing containing circuitry coupled to the solar panel, a first connector of a first type disposed on a first side of the housing, and, a second connector of a second type disposed on a second side of the housing, wherein the first connector is configured to mate with a connector of the second type, and the second connector is configured to mate with a connector of the first type to allow additional modular solar devices to be connected to the modular solar device.

The foregoing and other features of construction and operation will be more readily understood and fully appreciated from the following detailed disclosure, taken in conjunction with accompanying drawings.

BRIEF DESCRIPTION OF THE DRAWINGS

Some of the embodiments will be described in detail, with reference to the following figures, wherein like designations denote like members, wherein:

FIG. 6 depicts a cross-sectional view of the first connector of the modular solar device of FIG. 5;

FIG. 7 depicts a top view of the first connector of the modular solar device of FIG. 5;

FIG. 8 depicts a cross-sectional view of the second connector of the modular solar device of FIG. 5;

FIG. 9 depicts a top view of the second connector of the modular solar device of FIG. 5;

DETAILED DESCRIPTION

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

In brief overview, a plurality of modular solar panel devices can be easily and manually connected together or removed from one another to form a custom sized solar panel array. Each solar panel includes two connectors of different types that are configured to mate with the opposing type of connector. In this way, a user can quickly and easily connect additional solar panels to customize a physical size of the solar panel array as well as an electrical output of the solar panel array. As an example, two or more solar panels can be physically connected together and electrically coupled together to increase an electrical output or generation for charging one or more batteries or otherwise providing electrical energy in locations without AC mains connections. Conversely, one or more solar panels can be quickly and manually disconnected from the array to reduce the physical size and/or the electrical output of the array.

Moreover, the structural configuration of the connectors allow for the solar devices to be moved with respect to a neighboring solar device, and locked into position after being moved. For example, one solar device of the array can be moved such that an angle greater than or less than zero is formed between the moved solar device and the neighboring solar device. A locking device, such as a locking pin, is used to secure the moved solar device in position and maintain the angle between the neighboring solar devices. In this way, various shapes of the solar panel array can be achieved to maximize a capturing of incoming solar radiation and thus improve the electrical output of the solar panel array.

Figure 1:
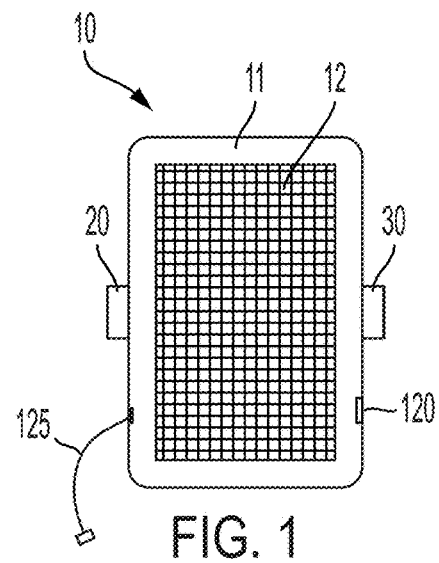
FIG. 1 depicts a schematic view of an embodiment of a modular solar device, in accordance with embodiments of the present invention.

Referring now to the drawings, FIG. 1 depicts a schematic view of an embodiment of a modular solar device 10, in accordance with embodiments of the present invention. The modular solar device 10 includes a solar panel 12 secured with a ruggedized housing 11, capable of generating direct current (DC) electricity for charging one or more electronic devices. The solar panel 12 may be a solar panel, a photovoltaic module, a photovoltaic panel, and the like, having a packaged interconnected assembly of solar cells or photovoltaic cells. For example, the solar panel 12 may be composed of several layers, wherein each layer may be a structural or load carrying layer, reflective layer, absorbing layer, cooling layer, photoactive layer, etc. The structural layer may be made of glass or other materials meeting structural requirements, transparency requirements, cost requirements, manufacturing requirements, and other requirements known to those having skill in the art. Additionally, the structural layer may be flexible or rigid. The photoactive layer may be composed of materials such as semiconductors that show photoactivity, and may be associated with the structural layer by various methods such as laying or deposition on the structural layers forming photovoltaic units or modules. Photoactive materials may be amorphous or crystalline, mono or poly crystalline structures, and/or elements or compounds including, but not limited to, silicon, cadmium, halogens, mercury, zinc, iridium, tellurium, copper, gold, silver, gallium, arsenides, selenium, organic or polymer materials, and/or a combination thereof. The solar panel 12 may include different kinds of photovoltaic cells. For example, the photovoltaic cells may be rigid, flexible, thin film, bulk cell, etc., and can be produced by changing the method of association with the structural layer. The photovoltaic cells of the solar panel 12 may be interconnected by various methods in series or parallel to meet voltage and/or current requirements. Connection between photovoltaic cells may be achieved by using a perimeter connector, a conductive grid on the upper and/or lower surface of the photoactive layer or by a thin layer of conductive material. The connections may be a positive type and a negative type depending on the type of photoactive material connected by the connection. If a positive type connection is connected to another positive type connection, it results in a parallel connection. Likewise, if a negative type connection is connected to another negative type connection, it results in a parallel connection. When a positive type connection is connected to a negative connection, or vice versa, it results in a series connection. One having skill in the art should appreciate that a higher voltage may be achieved by increasing the number of series connection and a higher current may be achieved by increasing the number of parallel connections. Moreover, the productivity of the solar panel 12 may depend on the number or density of incident photons on the photoactive layer. As a photon hits a photoactive material unit or layer of the solar panel 12, the energy of the photon is absorbed or used by the material to excite and delocate an electron; the delocation of the electron(s) thus creates a flow of electrical energy. As this process repeats, a flow of many electrons create a flow of current (electrical energy) though a closed circuit. Therefore, the electrical energy, or current, generated may be harnessed to power an electrical device or to charge a battery.

The circuitry of the solar panel 12 and other electrical components are housed within a housing 11 so that the circuitry and electrical components are safely protected within the housing 11. The electrical components housed within the housing 11 may include various conductors, circuit board(s), a charge controller, a microprocessor, a storage device, one or more input/output interfaces, voltage regulator, and other electronic components. The charge controller may be connected to positive and negative poles of the solar panel 12 connector or grid, thus becoming a part of the closed circuit though which the migrating electrons can flow. The charge controller serves various functions including current regulation, checking back flow of current/electrical energy, preventing overcharging or overdischarging of a battery, and protecting the closed circuit from destructive surges in current. One having skill in the art should appreciate that the charge controller may be one or more diodes, transistors, integrated circuits, chips, relays or a combination thereof. The microprocessor or controller is configured to provide instructions to other components of the solar panel device. The input/output (I/O) interface includes any system for exchanging information to or from the solar panel device 10. It should be appreciated that additional electronic components and circuitry may be included or removed, and that the components listed herein is not an exhaustive list.

The electrical components associated with the solar panel 12 and the solar device 10 are protected from physical damage and environmental damage due to the housing 11. In an exemplary embodiment, the housing is ruggedized. For example, the housing 11 is made to be weatherproof and waterproof to prevent ingress of water or other environmental elements into an interior of the housing 11. The solar panel 12 is secured by the housing 11 along the edges of the solar panel 12 to retain the solar panel 12 in a fixed position. In an exemplary embodiment, the housing 11 is overmolded onto the edges of the solar panel 12 to create a seal at the joint between the solar panel 12 and the housing 11. In another exemplary embodiment, a gasket is placed between the edges of the solar panel 12 and an inner surface of the housing 11 to form a seal therebetween; a silicone bead may be applied to further seal the joint between the solar panel 12 and the housing 11. Moreover, the housing 11, if ruggedized, is formed from impact-resistant material, such as ABS, polycarbonate, PPSU, and UHMW. The material of the housing 11 is selected for toughness and durability to protect the electrical components housed within the housing 11 from damage should the solar panel device 10 be dropped or otherwise subjected to an external force. Other materials can be used for a housing, such as rubber, nylon, fabric, etc., in applications less prone to impacts.

Moreover, the modular solar device 10 includes a first connector 20 disposed on a first side of the housing 11 and a second connector 30 disposed on an opposing second side of the housing 11. The first connector 20 and the second connector 30 are configured to be able to mate or otherwise be coupled to each other when forming a larger solar panel array. In an exemplary embodiment, the first connector 20 is of a first type and the second connector 20 is of a second type of connector which is different than the first type of connector. The difference between the first connector 20 and the second connector 30 allows for a successful mating between the connectors 20, 30 for joining additional solar panel devices to the solar panel device 10. As an example, the first connector 20 is configured to mate with a connector of a different type and the second connector 30 is configured to mate with a connector of a different type to allow additional modular solar devices to be connected to the modular solar device 10, as described in greater detail infra. In this way, an individual solar device panel 10 can be easily and manually connected to another solar device panel 10 to form an array 100, which is thus scalable because any number of panels can be added to increase a size and output of a solar panel array 100.

Further, adding modular solar panel devices 10 together can increase the generation of electrical energy by electrically coupling the devices 10. For example, each module or each solar panel device 10 may have its own charge controller. In other embodiments, there may be a single module/device designated as the module which outputs electrical energy and this module may be the only module which includes a charge controller. In yet another embodiment, the charge controller may be detachable such that it can be attached to any single module, thereby designating that module as the module which outputs electrical energy to an electronic device. The designated module should be understood to mean the module which an electronic device is attached to. Thus, all the electrical energy produced by the scalable solar module array 100 will be sent to this module via the cables 125 and thereby outputted, transferred, or sent to an electronic device.

Embodiments of the solar panels device 10 also include a receptacle 120. The receptacle 120 is configured to be coupled or mate with a cable, cord, or other means which may support the flow or transfer of electrical energy (e.g., current). The receptacle 120 may be a socket, receptacle, jack, USB port (such as type-A, type-B, or type-C USB), mini-USB port, micro-USB port, lightning USB port or other electrical connection device that may accept electrical pins or contacts from an electrical plug or cord. For example, the receptacle 120 may be configured to accept or mate with a cable 125. The cable 125 is a cable or cord which supports the flow or transfer of electrical energy. For example, the cable 125 may be a wire, a cable, a cord, a USB cord, a lightning cable or other cables capable of supporting the flow of electricity. The cable 125 may be flexible, bendable, stretchable, or otherwise capable of being manipulated into different shapes or orientations. The cable 125 may include attachment means for mating with the receptacle 120 on one or each end of the cable 125. The attachment means may be a plug, a USB connector, a socket, a jack or other electrical connection means which may allow for the cable 125 to mate or attach to the receptacle 120. The term USB connector refers generally to all types of USB connectors (type-A, type-B, type-C, mini, micro, lightning etc.) and should not be understood to be limiting to any specific type of USB connector. As such, the cable 125 may be easily plugged in and unplugged to create the electrical connection between the solar panel devices 10 forming the array. As such, the cables 125 are detachable, removable, temporary, or otherwise capable of being removed from the receptacle 120.

Moreover, in some embodiments, each solar panel device 10 may have different types of receptacles 120. For example, one solar panel 110 may have 4 receptacles 120. Two of the receptacles may be USB ports, one receptacle may be a mini-USB port, and one receptacle may be a lightning USB port. The types of receptacles may vary based on the types of electronic devices 150 users intend to charge or power with the scalable solar module array 100.

The receptacle 120 may also include a clasp. The clasp is a means for ensuring the attachment means of the cable 125 remains attached or mated to the receptacle 125. For example, the scalable solar module array 100 may be operated while a use is moving or traveling, particularly with high-speed applications (i.e., where users are traveling at high speeds) such as bicycling, motorcycling, skiing, snowboarding, running, and the like. The movement may result in bumps, pulls, knocks, jerks, tugs, etc. which may dislodge or remove the attachment means of the cable 125 from the receptacle 120, thus disrupting the flow of electrical energy. The clasp or similar securing means ensures that the attachment means remains attached or mated to the receptacle 120 until a user removes the clasp and pulls out or removes the cable 125 from the receptacle 120. This ensures that the flow of electrical energy is not disrupted until a user intentionally removes the cable 125. Thus, the clasp safeguards the flow of energy even when the scalable solar module array 100 is used in applications which would otherwise dislodge the cable 125.

Each solar panel device 10 may convert light to electrical energy as described above. However, the solar panel device 10 may be connectable to another solar panel device 10 through a cable 125 to electrically couple each solar panel device 10. Thus, any number of solar panel devices 10 may be included in the scalable solar module array 100. The solar panel devices 10 may be electrically coupled, connected, or otherwise attached to one another such that electrical energy produced in one solar panel device can be transferred or sent to another solar panel device.

Each solar panel device 10 may be identical (i.e., have the same size solar panel 12 and contain the same number of receptacles 120). In other embodiments, the solar panel devices 10 may have different size solar panels 12, contain a different number of receptacles 120, or have different types of receptacles 120. For example, a first solar panel device 10 may have four identical receptacles, a second module may have three receptacles, two of which are identical to the receptacles and one receptacle which is different. As described above, different electronic devices may require different types of receptacles. As such, certain solar panel devices 10 may be configured such that they are compatible with specific, popular or common electronic devices. For example, the type of receptacle used to connect one module to another may be standard, such that any one module can be connected to another. However, certain solar panel devices 10 may be sold with one or more differing types of receptacles such that electronic devices which require a receptacle which is different than the standard receptacle described above can be used with the scalable solar module array 100.

As each solar panel device 10 is connectable to one or more other solar panel devices, the electrical energy produced by each solar panel device 10 may be combined, augmented, supplemented, pooled, added together, merged, or aggregated. Thus, the amount of electrical energy produced by the scalable solar module array 100 will depend, in part, on the number of solar panel devices being used, and, in part, the type of electrical connections and circuitry. This allows for the scalable solar module array 100 to be scalable and customizable. For example, if more electrical energy is required for an application, users may simply connect one or more additional solar panel devices 10 to the existing array using one or more cables 125. If a user does not require the amount of electrical energy as the scalable solar module array 100 is configured to produce based on the number of modules present, one or more solar panel devices 10 may be removed by simply unplugging a cable 125 and disconnecting the solar panel device 10 from the neighboring solar panel device 10. In this way, users are not required to transport a unit larger than what is necessary for the desired application. Additionally, because solar panel devices 10 are easily interchanged, if one module malfunctions, breaks, or otherwise fails, a new module can be installed or connected without difficulty to replace the failing module, without having to replace the entire scalable solar module array 100.

Each solar panel device 10 may also be capable of providing its own electrical energy to an electronic device. For example, in one embodiment, the electrical energy produced by each solar panel device 10 is not pooled. Rather, each solar panel device 10 individually produces and outputs the electrical energy produced by the solar panel device 10. This allows for multiple electronic devices to be charged or connected at the same time. For example, in an embodiment having three solar panel devices 10, a first electronic device may be connected to the first solar panel device 10, a second electronic device may be connected to the second solar panel device 10, and a third electronic device may be connected to the third solar panel device 10. The electronic devices may be different types of devices. For example, the first electronic device may be a cell phone, the second electronic device may be a laptop, and the third electronic device may be a GPS. Moreover, in other embodiments, where a scalable solar module array 100 has multiple solar panel devices 10 and one of the modules does not have an electronic device plugged into it, the electrical energy produced by the module which is not charging an electronic device may transfer the electrical energy it produces to the remaining solar panel devices 10 which are charging electronic devices. For example, in an embodiment where there are again three solar panel devices 10, a first electronic device is plugged into the first solar panel device 10 and a second electronic device is plugged into the second solar panel device 10, but no electronic device is plugged into the third solar panel device 10. In this embodiment, the electrical energy produced by the third solar panel device 10 may be stored in a battery unit or may be transferred to the first and second solar panel devices 10 as described above, thereby increasing the amount of electrical energy the first and second solar panel devices 10 are able to output. When an electronic device is plugged into the third solar panel device 10, the third solar panel device 10 may stop transferring the electrical energy it produces to the first and second solar panel device 10 and may instead begin to charge the electronic device.

Moreover, additional solar panel devices 10 may be easily stored and can be accessible should a user require additional electrical energy. Each solar panel device 10 may have a thin cross-section. For example, each solar panel device 10 may be less than 0.25 inches thick in some embodiments or less than 0.1 inches thick in other embodiments. As such, the solar panel devices 10 can be stacked on top of one another without taking up additional storage space. For example, the additional solar panel devices 10 can be placed in a bag, in a backpack, in a trunk of a vehicle, in a cart, or in any other suitable storage space such that the additional modules are readily available to users. This is particularly useful while traveling. Users may place the additional solar panel devices 10 in a backpack, bag, or other storage container as they do not take up a large area. If the user is in a situation in which they require electrical energy, they can simply take one or more solar panel devices 10 out, mechanically connect them via connections 20, 30 electrically connect them using cables 125, and can immediately begin producing additional electrical energy.

The solar panel device 10 is referred to as a modular solar panel device because a size and dimension of the solar panel device 10 is standardized and the same as the next solar panel device added on to form a solar panel array. The solar panel device 100 is not limited to any specific size and dimension, but additional solar panel devices, especially the connectors 20, 30 are the same as the other devices in the larger array. In an alternative embodiments, the housing of the devices and the size of the solar panel varies from device to device in the array, while only the connectors remain modular.

Figure 2:
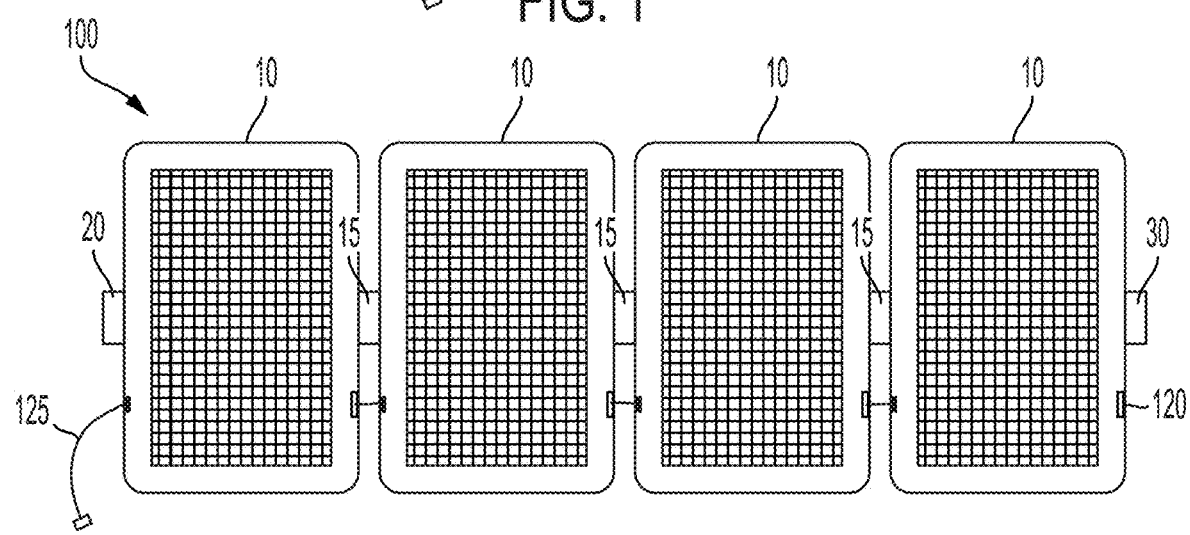
FIG. 2 depicts a schematic view of a scalable solar panel array, in accordance with embodiments of the present invention.
Figure 3A:
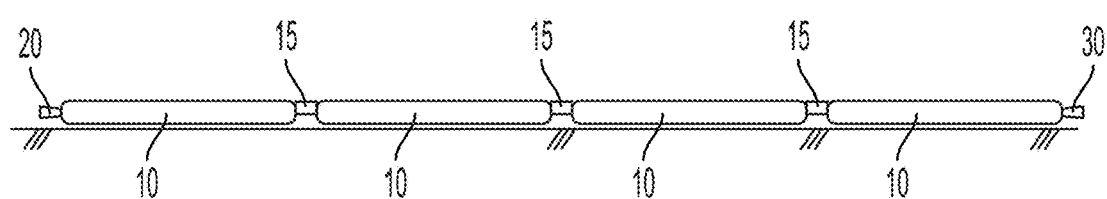
FIG. 3A depicts the scalable solar panel array in a flat position, in accordance with embodiments of the present invention.
Figure 3B:
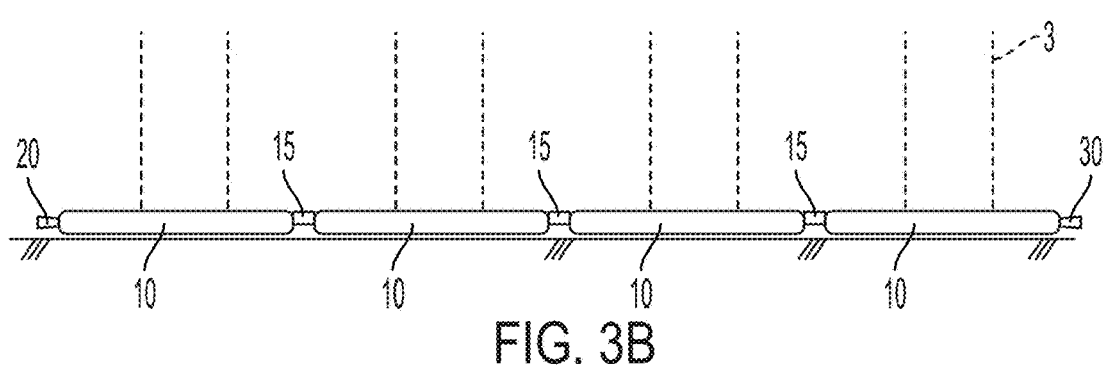
FIG. 3B depicts incoming solar radiation onto the scalable solar panel when in the flat position depicted in FIG. 3A, in accordance with embodiments of the present invention.

FIG. 2 depicts a schematic view of a scalable solar panel array 100, in accordance with embodiments of the present invention. The solar panel array 100 includes a plurality of modular solar devices 10 connected together to form an array of solar panels. Each modular solar device 10 includes the first connector 20 of a first type and the second connector 20 of a second type. The connections between the first connector 20 of the first type and the second connector 30 of the second type of neighboring modular solar devices 10 form pivot points 15. The structural configuration of the first connector 20 and the second connector are such that each solar panel device 10 in the solar panel array 100 is movable with respect to the other solar panel devices 100. An individual solar panel device 100 rotatable, adjustable, foldable, pivotable, or otherwise movable about the pivot point 15. The movability of the solar panel devices 10 of the array 100 allow a user to customize a shape or layout of the array 100. For example, the user may desire to manipulate the solar panel devices 10 to concentrate the solar radiation onto the solar panels 12 to improve an efficiency of the array 100. Consider the example shown in FIG. 3A, in which the solar panel array 100 is laid flat on the ground. In the illustrated example, the solar panel array 100 is made up of four individual, modular solar panel devices 10, connected to other in a straight line. An angle between two neighboring solar panel devices 10 is zero or approximately zero. FIG. 3B shows incident solar radiation 3 contacting each of the four solar panels 12 equally. While this configuration may generate a sufficient amount of electrical energy for some applications, the solar radiation 3 is not concentrated in any way to a specific portion of the solar panel array 100 in the event higher electrical generation is required.

Figure 4A:
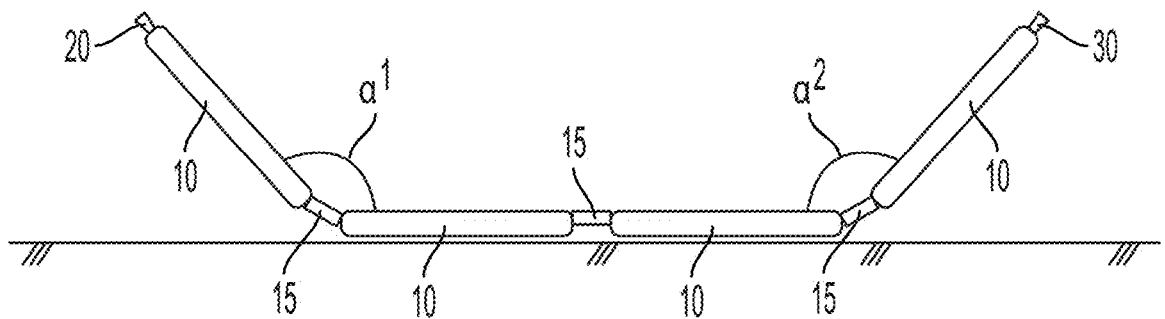
FIG. 4A depicts the scalable solar panel array in a modified position, in accordance with embodiments of the present invention.
Figure 4B:
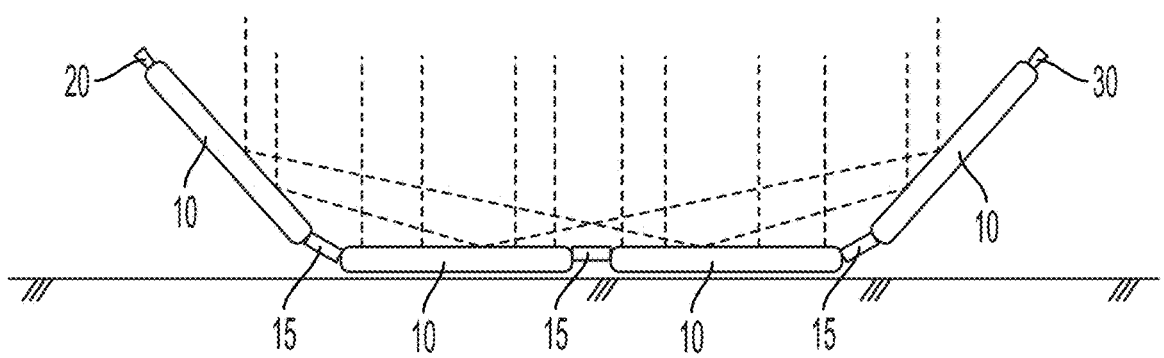
FIG. 4B depicts incoming solar radiation onto the scalable solar panel array when in the modified position depicted in 4A, in accordance with embodiments of the present invention.

To concentrate or otherwise maximize the collection of solar radiation, the solar panel array 100 can be adjusted to a modified position, as shown in FIG. 4A. In the illustrated embodiment, the two end solar panel devices 10 of the solar panel array 100 have been moved about a pivot point 15 to form an angle α1 and α2, respectively, whereas the two center solar panel devices remain unmoved. Angles α1 and α2 can be any degree greater than or less than zero, and do not have to be same. In this position, the two end solar panel devices 10 act as a concentrator to concentrate, focus, reflect, refracts, etc., incoming solar radiation 3 into concentrated radiation proximate the middle two solar panels of the array 100, as shown in FIG. 4B. The surface of the solar panels may transmit and/or refract incoming solar radiation 3, concentrating the incoming solar radiation 3 towards a solar panel 12 of another solar panel device 10 of the array (e.g. middle two solar panels in FIG. 4B). Concentrating the solar radiation 3 result in a large amount of incoming solar radiation 3 contacting a specific portion of the solar array 100, which can generate electrical energy faster then solar radiation evenly contacting all solar panels of the array 100.

In embodiments where the solar panel devices 100 are not electrically coupled to one another when mechanically connected in the array 100, the user can plug the electronic device into the solar panel device 10 optimized for concentrated solar radiation.

Furthermore, the angles α1 and α2 can be maintained by locking the adjusted solar panel device 100 into place. The pivot points 15 (i.e. mated connection between a first connector 10 and a second connector 20 of another device) initially for free rotation/movement of the solar panel devices 10 until the locking device is used to fully tighten the connectors 20, 30 together. When the connectors 20, 30 are fully tightened together, the two adjacent solar panel devices cannot freely rotate mov with respect to each other. The fully tightened connection maintains the adjusted position (e.g. upright, angled position showed in FIG. 4A), without the user needing to hold the panels or rely on an external object to prop up the panel. To once again adjust a configuration of the solar panel array 100, a user can loosen the connection at the pivot point, adjust the panel device, and re-tighten the connection. The ability to customize a shape and/or positioning of each solar panel device of the array 100 is advantageous because the user can adapt the array to the sunlight conditions in the field.

Figure 5:
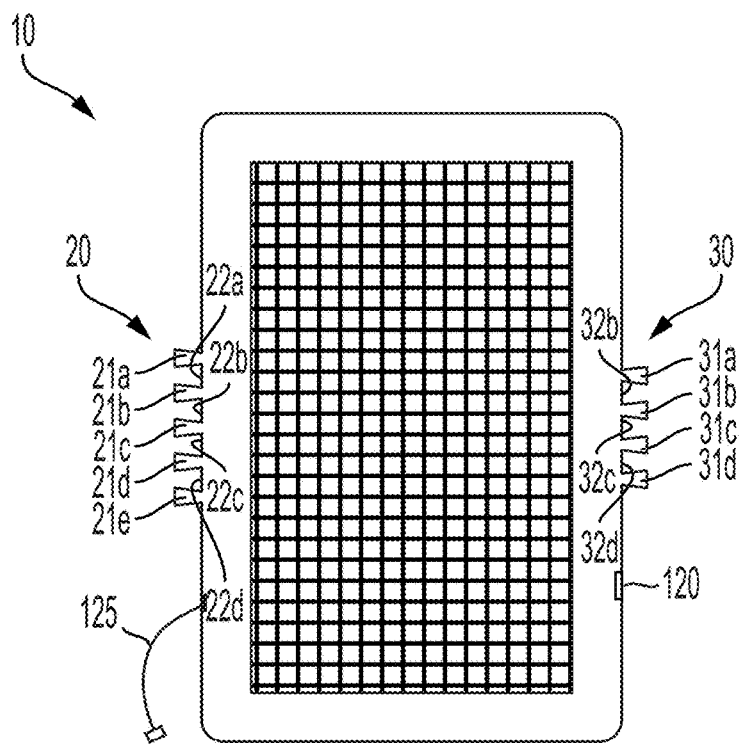
FIG. 5 depicts an exemplary embodiment of a modular solar device having a first connector and a second connector.

Referring now to FIGS. 5-12, an exemplary embodiment of a first connector 20 and a second connector 30 will now be described. FIG. 5 depicts a solar panel device 10 with the first connector 20 on a first side of the housing (e.g. left side) and the second connector 30 on a second side of the housing 11 (e.g. right side). The first connector 20 includes a plurality of fingers 21a, 21b, 21c, 21d, and 21e separated by a plurality of slots 22a, 22b, 22c, and 22d. While FIG. 5 illustrates the first connector 20 as having five fingers and four slots, the first connector 20 can have more or less than five fingers, and more or less than four slots. The fingers protrude 21a, 21b, 21c, 21d, and 21e away from the housing 11, and may be structurally integral with the housing 11. Alternatively, the fingers 21a, 21b, 21c, 21d, and 21e can be attached to the housing 11. The fingers 21a, 21b, 21c, 21d, and 21e each have a threaded central opening 27 that is aligned with neighboring fingers, as shown in FIGS. 6 and 7. The first connector 20 shown in FIG. 5-7 depict an embodiment of the first type of connector.

The second connector 30 includes a plurality of fingers 31a, 31b, 31c, and 31d separated by a plurality of slots 32a, 32b, and 32c. While FIG. 5 illustrates the second connector 30 as having four fingers and three slots, the second connector 30 can have more or less than four fingers, and more or less than three slots. The fingers protrude 31a, 31b, 31c, and 31d away from the housing 11, and may be structurally integral with the housing 11. Alternatively, the fingers 31a, 31b, 31c, and 31d can be attached to the housing 11. The fingers 31a, 31b, 31c, and 31d each have a threaded central opening 37 that is aligned with neighboring fingers, as shown in FIGS. 8 and 9. The second connector 30 shown in FIGS. 5 and 8-9 depict an embodiment of the second type of connector. To allow for proper mating between the first connector 20 and the second connector 30, the first type of connector includes one more finger and one more slot than the second type of connector, or vice versa.

Figure 10:
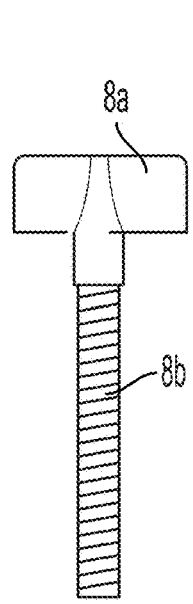
FIG. 10 depicts a locking pin, in accordance with embodiments of the present invention.
Figure 11:
FIG. 11 depicts a top view of the locking pin of FIG. 10.
Figure 12:
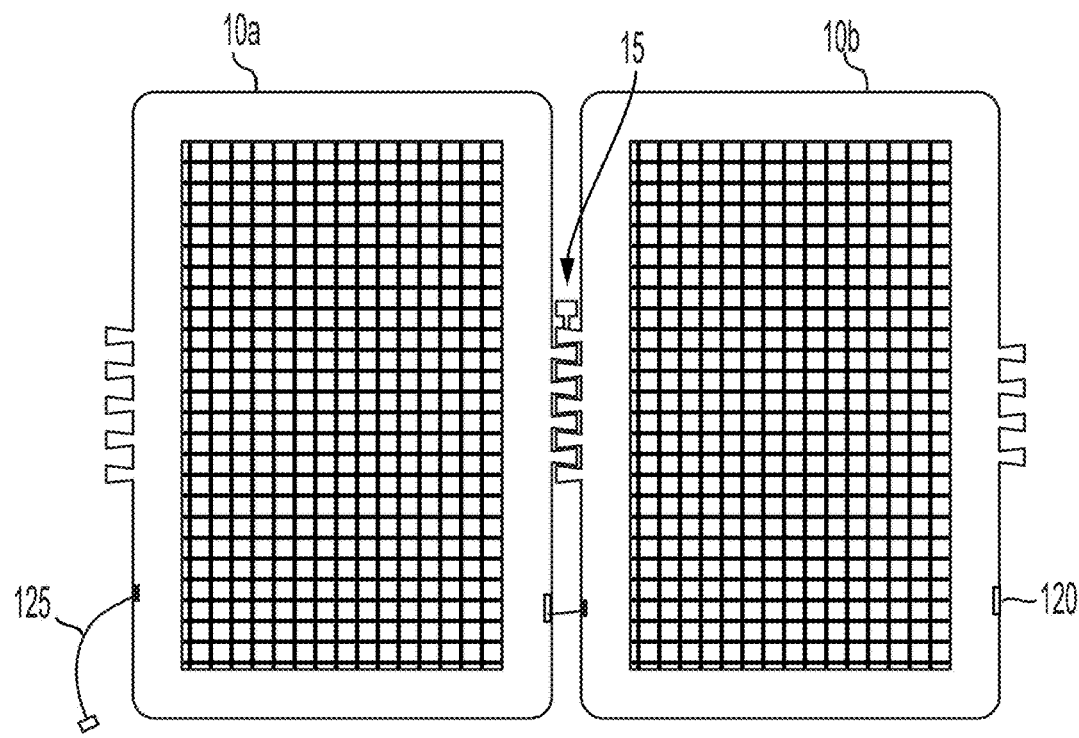
FIG. 12 depicts two modular solar devices connected together, with the locking inserted through a pivot point formed by a connection between two connectors of opposite type.

To add a solar panel device to left side of solar panel device 10, the fingers 21a, 21b, 21c, 21d, and 21e of the first connector 20 of the solar panel device 10 extend into the slots 32a, 32b, and 32c of a connector of the second type located on the right side of the panel to be added, as shown in FIG. 12. Likewise, the slots 22a, 22b, 22c, and 22d of the first connector 20 receive the fingers 31a, 31b, 31c, and 31d of the connector of the second type located on the right side of the panel to be added. The central openings 27 of the fingers 21a, 21b, 21c, 21d, and 21e of the first connector 20 are aligned with the central openings 37 of the fingers 31a, 31b, 31c, and 31d of the second type of connector for receiving a locking device 8. FIGS. 10 and 11 depicts an embodiment of a locking device 8. The locking device 8 is a locking pin that includes a gripping portion 8a and a threaded shaft portion 8b. The threaded shaft portion 8b includes outer threads that correspond to the inner threads of the central openings 27, 37, and extends though the central openings 27 and central openings 37 to bind the two solar panel devices together and form a pivot point 15, as shown in FIG. 12. The two solar panel devices 10a, 10b can also be electrically coupled by connecting the cable 125 of one solar panel device 10b to the receptacle 120 of the other solar panel device 10a, as shown in FIG. 12. The cable 125 of the solar panel device 10a shown on the left is available for electrically coupling to a receptable of a further solar panel device. Likewise, the receptacle 120 of the solar panel device 10b on the right is open for receiving a cable of a further solar panel device to electrically couple another solar panel device. Thus, the mechanical and electrical coupling of multiple solar panel devices to form an array 100 is easily achieved in the field, and can be done with no extra tools or hardware.

Figure 13:
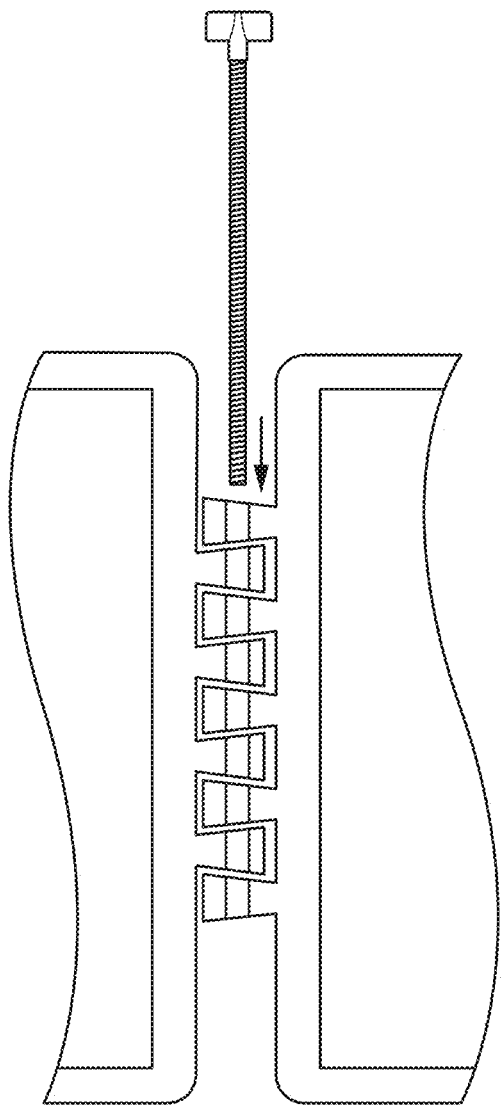
FIG. 13 depicts an enlarged view of a locking pin prior to insertion.
Figure 14:
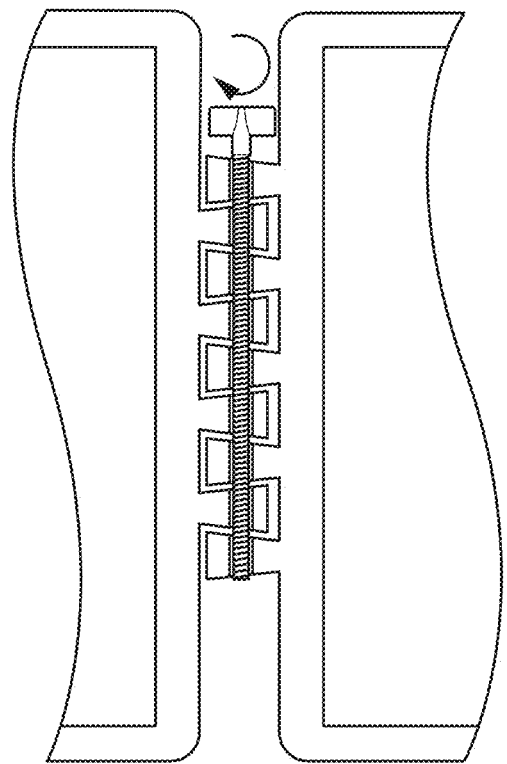
FIG. 14 depicts an enlarged view of the locking pin being rotated to lock the two module solar devices into position with respect to each other.
Figure 15:
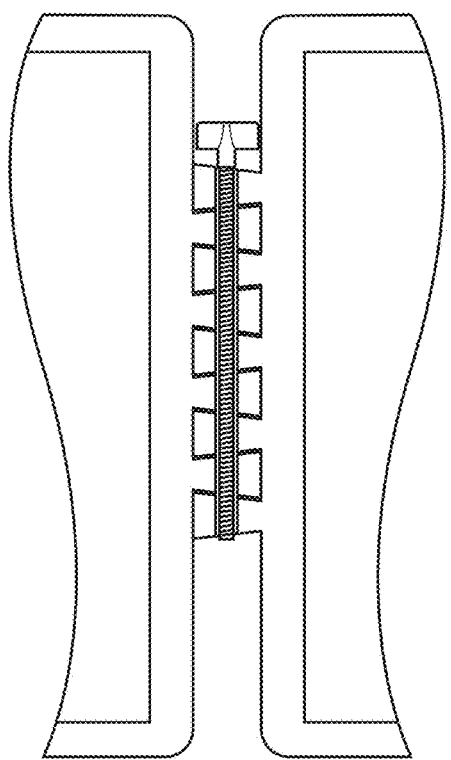
FIG. 15 depicts a final locked position between the two modular solar devices.
Figure 16:
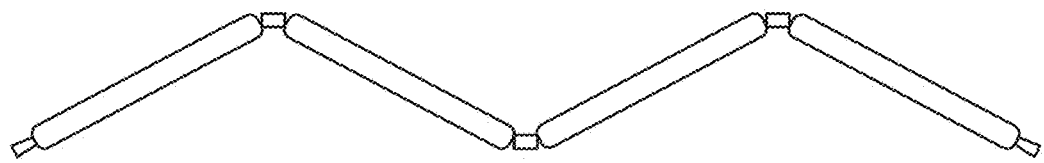
FIG. 16 depicts a first possible shape of the scalable solar panel array, in accordance with embodiments of the present invention.
Figure 17:
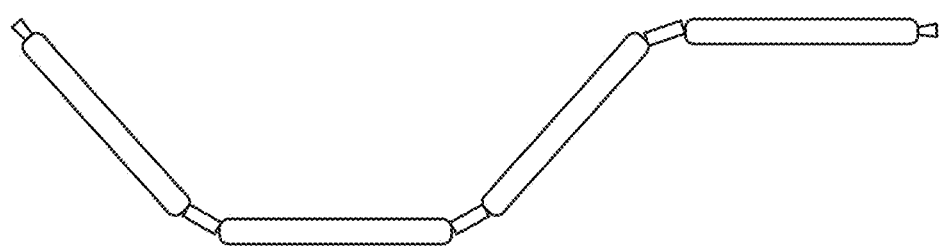
FIG. 17 depicts a second possible shape of the scalable solar panel array, in accordance with embodiments of the present invention.
Figure 18:
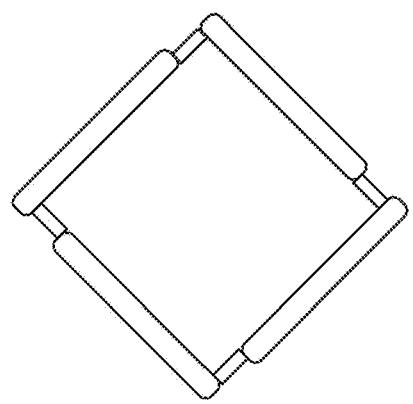
FIG. 18 depicts a third possible shape of the scalable solar panel array, in accordance with embodiments of the present invention.
Figure 19:
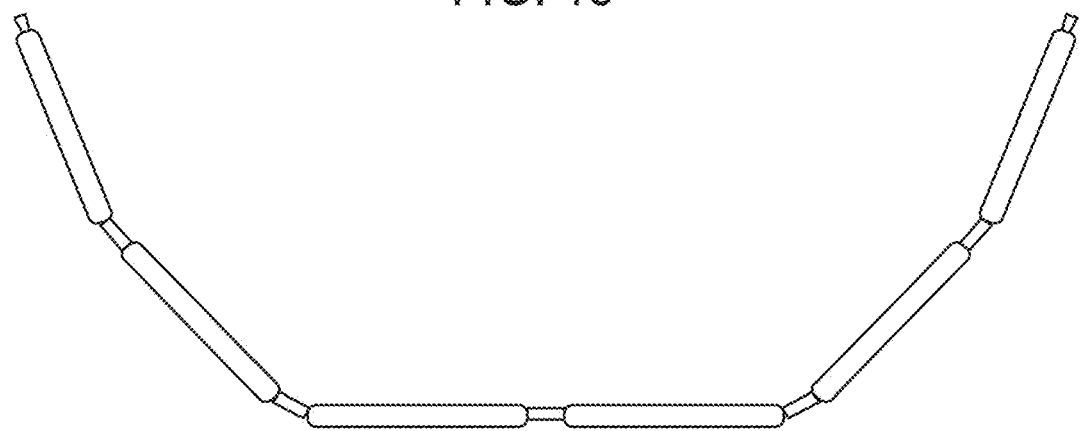
FIG. 19 depicts a fourth possible shape of the scalable solar panel array, in accordance with embodiments of the present invention.
Figure 20:
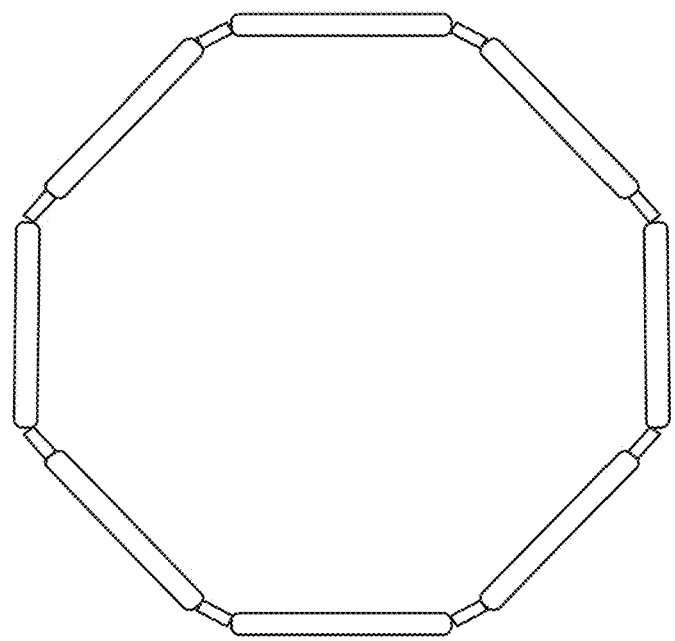
FIG. 20 depicts a fifth possible shape of the scalable solar panel array, in accordance with embodiments of the present invention.
Figure 21:
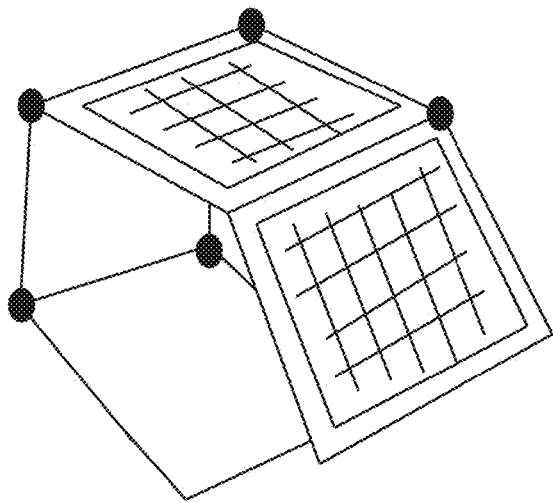
FIG. 21 depicts a perspective view of a sixth possible shape of the scalable solar panel array, in accordance with embodiments of the present invention.
Figure 22:
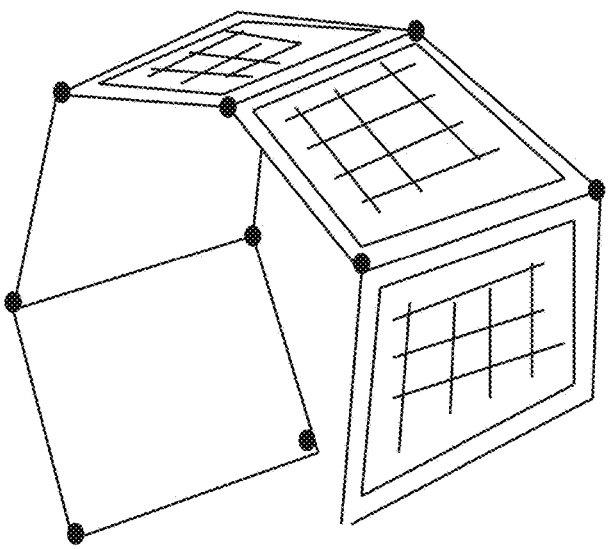
FIG. 22 depicts a perspective view of a seventh possible shape of the scalable solar panel array, in accordance with embodiments of the present invention.
Figure 23:
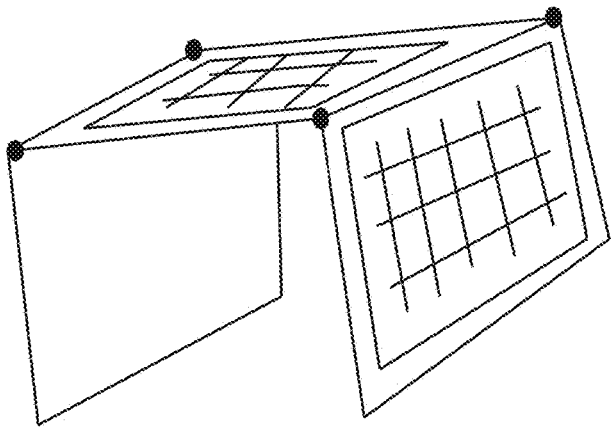
FIG. 23 depicts a perspective view of an eight possible shape of the scalable solar panel array, in accordance with embodiments of the present invention.

FIGS. 13-15 depict the manner in which the locking device 8 is used to tighten the mated connections and lock two solar panel devices into position relative to each other. FIG. 13 depicts the locking device 18 prior to being inserted through the central openings 27 and 37. The locking device 8 is configured to be inserted in a direction indicated by the arrow, passing through the central openings 27, 37 of the connectors 20, 30 until the gripping portion 8a contacts the top finger 21a. The locking device 8 may then be rotated in a clockwise connection indicated by the arrow to begin tightening the connection between the connectors 20, 30. As the locking device 8a is rotated, gaps between the fingers become smaller and smaller until the fingers tough each other with enough mechanical interference to prevent rotational movement between the fingers, and thus between the connected solar device panels, as shown in FIG. 15. To loosen the connection for positioning the panel at a desired angle, the locking device 8 is rotated counter clockwise until the fingers have gaps between them, allowing for relative rotational movement between the fingers, and thus the solar panel devices. The adjusted panel is held into place at the desired angle until the locking device secures the fingers together and locks the connection at the pivot point.

Similarly, to add a solar panel device to right side of solar panel device 10, the fingers 31a, 31b, 31c, and 31d of the second connector 30 of the solar panel device 10 extend into the slots 22a, 22b, 22c, and 22d of a connector of the first type located on the left side of the panel to be added. Likewise, the slots 32a, 32b, and 32c of the second connector 30 receive the fingers 22a, 22b, and 22c of the connector of the first type located on the left side of the panel to be added. The central openings 37 of the fingers 31a, 31b, 31c, and 31d of the second connector 30 are aligned with the central openings 27 of the fingers 21a, 21b, 21c, 21d, and 21e of the first type of connector for receiving the locking device 8, as described supra.

Accordingly, successive solar panel devices can be added or removed to scale the solar panel array up or down, depending on the desired size and/or electrical requirements, and a position of the solar panels with respect to the incoming solar radiation can be optimized and locked into such position. As a result, various sized and shapes of a solar panel array can be achieved using the modular solar panel devices 10 described herein. FIGS. 16-23 show eight additional possible shapes that a user can configure for the solar panel array. Although only eight possible shapes are shown, many different shapes and configurations are possible without departing from the scope of the present invention. The modularity of the scalable solar module array 100 also allows the unit to be set up in different shapes, based on the application. For example, in some application setting up all of the modules in a straight line may be desirable. However, in other applications, this may not be desirable or feasible. For example, where there is limited space to lay out the modules or where there is limited access to sunlight (i.e., if the modules were laid out in a straight line all modules would not have access to sunlight) an arrangement of the modules in a straight line may be impractical or impossible. In these applications, it may be desirable to connect a first module to the left side of a second module and then to connect a third module to the bottom of the second module, creating an "L" shape, for example, making the area on which the scalable solar module array 100 more compact, rather than spread out in a straight line. Any number of shapes or orientations can be accomplished, depending on the number of modules being used. As such, the scalable solar module array 100 can be customized to any application and can address and overcome space, access, light restriction or other restrictions, limitations, or boundaries which may be present. Moreover, because the cables 125 may be flexible, the modules are not limited to being arranged in straight lines or 90-degree angles. The cables 125 may be flexed such that adjacent modules may be placed at any angle relative to the module it is connected to. The orientation or angle of the modules with respect to adjacent modules is only limited by the length of the cable 125 connecting the modules. As the cables 125 can be any length, the number of potential set-ups, orientations, or alignments of the scalable solar module array 100 are abundant. Thus, the scalable solar module array 100 can be scaled and customized to nearly any application or situation which may be encountered.

The scalable solar panel array 100 is configured to provide electrical energy to an electronic device, as described above. An electronic device may include a cell phone, a tablet, a laptop, a computer, a GPS, a handheld device, a flashlight, a radio, a communication device, a heating device, or any other device which is powered by electrical energy. Moreover, the electronic device may be a battery or other device which stores electrical energy. The scalable solar panel array 100 may charge or power an electronic device directly or indirectly. Direct charging of an electronic device may occur through electrical communication between a solar panel device 10 and the electronic device. For instance, the electronic device may plug into a receptacle 120 coupled to one of the solar panel devices 10 of the scalable solar panel array 100 via a charging cable to receive electrical energy to charge the battery housed within an electronic device. The charging cable may be the same cable as the cable 125. However, in other embodiments, the charging cable may be specific to the electronic device. For example, the charging cable may have one end with the same attachment means as the cable 125, but the other end may have a different attachment means for attaching to the electronic device. In yet another embodiment, the charging cable may not have any of the same attachment means as the cable 125 and the receptacle 120 which the charging cable attaches to may also be a different type of receptacle from other receptacles included in the scalable solar panel array 100. In other embodiments, the charging cable may be a cable which is provided with the electronic device and is separate from the scalable solar panel array 100.

Indirect charging of an electronic device may occur through the electrical communication between the scalable solar panel array 100 and the electronic device. For instance, the electronic device may plug into a receptacle 120 coupled to a battery unit to receive electrical energy to charge the battery housed within an electronic device. Moreover, the electronic device may be charged or powered using wireless charging. For example, the electronic device may be charged using radio charging, inductive charging, resonance charging, or the like.

Figure 24:
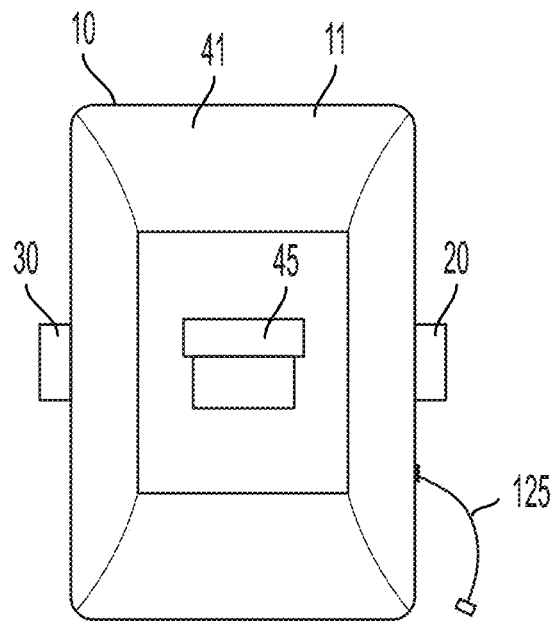
FIG. 24 depicts a rear view of the modular solar device, in accordance with embodiments of the present invention.
Figure 25:
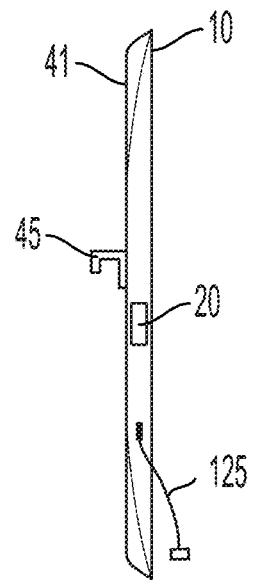
FIG. 25 depicts a side view of the modular solar device, in accordance with embodiments of the present invention.
Figure 26:
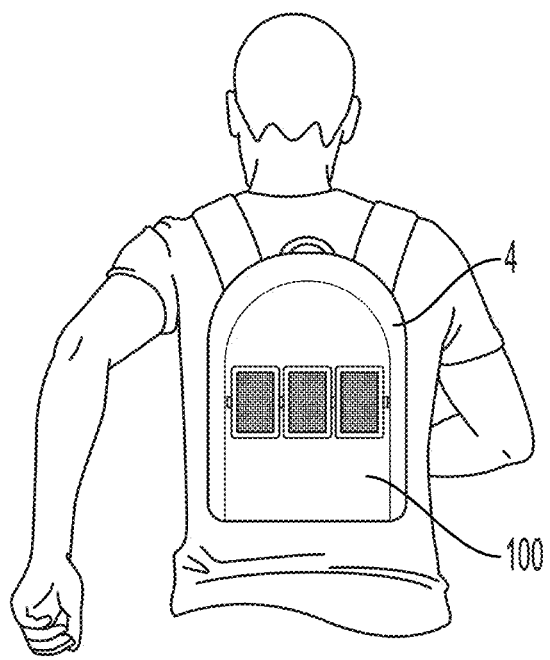
FIG. 26 depicts the scalable solar panel array attached to an object, in accordance with embodiments of the present invention.

With continued references to the drawings, FIGS. 24-26 show how the solar panel array 100 can be attached to an object. FIGS. 24 and 25 shows a rear view and a side view, respectively of the solar panel device 10. The solar panel device 10 optionally includes an attachment device 45 disposed on an exterior surface 41 of the ruggedized housing 11 for attaching the modular solar device to an object. In the illustrated embodiment, the attachment device 45 is a hook, but embodiments of the attachment device can be a latch, a buckle, a magnet, a section of hook and loop fasteners, and the like. FIG. 26 depicts the solar panel array 100 attached to an object 4, such as a backpack. The solar panel device 10 or a solar panel array 100 can be attached to various objects such as motor vehicles, bicycles, clothes, jackets, etc.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the invention, as required by the following claims. The claims provide the scope of the coverage of the invention and should not be limited to the specific examples provided herein.

What is claimed is:

1. A modular solar device comprising:
  a solar panel;
  a housing containing circuitry coupled to the solar panel;
  a first connector of a first type disposed on the housing; and
  a second connector of a second type disposed on the housing;
  a first locking pin comprising a gripping portion at a top end of the first locking pin and a threaded body portion located below the gripping portion, wherein the gripping portion extends laterally from the threaded body portion to provide a surface for gripping the first locking pin to exert a rotational force;
  a second locking pin comprising a gripping portion at a top end of the second locking pin and a threaded body portion located below the gripping portion, wherein the gripping portion extends laterally from the threaded body portion to provide a surface for gripping the second locking pin to exert a rotational force;
  wherein the first connector is configured to mate with a connector of the second type, and the second connector is configured to mate with a connector of the first type to allow additional modular solar devices to be connected to the modular solar device;
  wherein the first connector includes a combination of fingers and slots, the fingers having a central threaded opening, and the second connector includes a combination of fingers and slots, the fingers having a central threaded opening;
  wherein the central threaded opening of the first connector is configured to receive the first locking pin, such that rotation of the first locking pin once inserted through the central threaded opening of the first connector increases a mechanical interference between the fingers of the first connector and fingers of a first neighboring modular solar device to lock the modular solar device to the first neighboring modular solar device;
  wherein the central threaded opening of the second connector is configured to receive the second locking pin, such that rotation of the second locking pin once inserted through the central threaded opening of the second connector increases a mechanical interference between the fingers of the second connector and fingers of a second neighboring modular solar device to lock the modular solar device to the second neighboring modular solar device.

2. The modular device of claim 1, wherein the first connector of the first type is disposed on a first side of the housing, and the second connector of the second type is disposed on a second side of the housing.

3. The modular solar device of claim 1, wherein the first type of connector includes one more finger and one more slot than the second type of connector.

4. The modular solar device of claim 1, further comprising at least one cable connection interface coupled to the circuitry contained within the housing, the at least one cable connection interface comprising a receptacle accessible proximate an exterior surface of the housing.

5. The modular solar device of claim 4, wherein the at least one cable connection interface allows a transfer of an electrical energy generated by the modular solar device to an external power consuming device.

6. The modular solar device of claim 1, further comprising an attachment device disposed on an exterior surface of the housing for attaching the modular solar device to an object.

7. The modular solar device of claim 1, further comprising a cable attached to the housing and configured to be plugged into a neighboring modular solar device to electrically couple the modular solar device with the neighboring modular solar device.

8. The modular solar device of claim 1, wherein the threaded body portion of the first locking pin includes threads that continuously extend from the gripping portion to a bottom end of the first locking pin.

9. A method comprising:
providing a modular solar panel device including a solar panel, a housing containing circuitry coupled to the solar panel, a first connector of a first type disposed on a first side of the housing, and, a second connector of a second type disposed on a second side of the housing, a first locking pin comprising a gripping portion at a top end of the first locking pin and a threaded body portion located below the gripping portion, wherein the gripping portion extends laterally from the threaded body portion to provide a surface for gripping the first locking pin to exert a rotational force, and a second locking pin comprising a gripping portion at a top end of the second locking pin and a threaded body portion located below the gripping portion, wherein the gripping portion extends laterally from the threaded body portion to provide a surface for gripping the second locking pin to exert a rotational force;
wherein the first connector is configured to mate with a connector of the second type, and the second connector is configured to mate with a connector of the first type to allow additional modular solar devices to be connected to the modular solar device;
wherein the first connector includes a combination of fingers and slots, the fingers having a central threaded opening, and the second connector includes a combination of fingers and slots, the fingers having a central threaded opening;
wherein the central threaded opening of the first connector is configured to receive the first locking pin, such that rotation of the first locking pin once inserted through the central threaded opening increases a mechanical interference between the fingers of the first connector and fingers of a first neighboring modular solar device to lock the modular solar device to the first neighboring modular solar device;
wherein the central threaded opening of the second connector is configured to receive the second locking pin, such that rotation of the second locking pin once inserted through the central threaded opening increases a mechanical interference between the fingers of the second connector and fingers of a second neighboring modular solar device to lock the modular solar device to the second neighboring modular solar device.

* * * * *